(12) United States Patent
Kitade et al.

(10) Patent No.: US 7,204,915 B2
(45) Date of Patent: Apr. 17, 2007

(54) PATTERNED MEDIUM, METHOD FOR FABRICATING SAME AND METHOD FOR EVALUATING SAME

(75) Inventors: Yasuhiro Kitade, Kawasaki (JP); Hitoshi Komoriya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 282 days.

(21) Appl. No.: 10/839,160

(22) Filed: May 6, 2004

(65) Prior Publication Data

US 2005/0142285 A1 Jun. 30, 2005

(30) Foreign Application Priority Data

Dec. 26, 2003 (JP) ............... 2003-433707

(51) Int. Cl.
*C23C 14/35* (2006.01)
(52) U.S. Cl. ............... 204/192.2; 204/192.13; 204/298.03
(58) Field of Classification Search ............ 204/192.2, 204/192.13, 298.03
See application file for complete search history.

(56) References Cited

FOREIGN PATENT DOCUMENTS

| JP | 2001-110050 | 4/2001 |
|---|---|---|
| JP | 2002-109712 | 4/2002 |
| JP | 2003-203333 | 7/2003 |

OTHER PUBLICATIONS

Moritz et al. "Domain structure in magnetic dots prepared by nanoimprint and e-beam lithography", Journal of Applied Physics, vol. 91, No. 10, May 15, 2002, pp. 7314-7316.*
Schneider et al. "Magnetization loops of submicron ferromagnetic permalloy dot arrays", Journal of Applied Physics, vol. 86, No. 8, Oct. 15, 1999, pp. 4539-4543.*
Moritz et al. "Writing and reading bits on pre-patterned media", Applied Physics Letters, vol. 84, No. 9, Mar. 1, 2004, pp. 1519-1521.*

* cited by examiner

*Primary Examiner*—Rodney G. McDonald
(74) *Attorney, Agent, or Firm*—Armstrong, Kratz, Quintos, Hanson & Brooks, LLP

(57) ABSTRACT

A process for fabricating a patterned medium including a dot-forming step for forming a dot array constituted by sample magnetic dots having a predetermined size such as a single domain particle size determined theoretically from the magnetic metal thin for a sample medium having a magnetic metal film formed with the initial conditions; a demagnetization step for AC-demagnetizing the dot array; a ratio measurement step for measuring the ratio of single magnetic domains by observing the magnetic pattern of each of the sample dots after the AC-demagnetization; and an adjustment step for determining conditions of the sputtering apparatus for forming a solid state magnetic metal thin film by adjusting the film-forming conditions such that the ratio of the single magnetic domains equals to or exceeds a predetermined value.

12 Claims, 9 Drawing Sheets

FORMATION OF A LINING LAYER

FORMATION OF AN INTERMEDIATE LAYER

FORMATION OF A RECORDING LAYER

FORMATION OF A RESIST MASK

DRY ETCHING

FORMATION OF A PROTECTIVE LAYER

FIG. 5
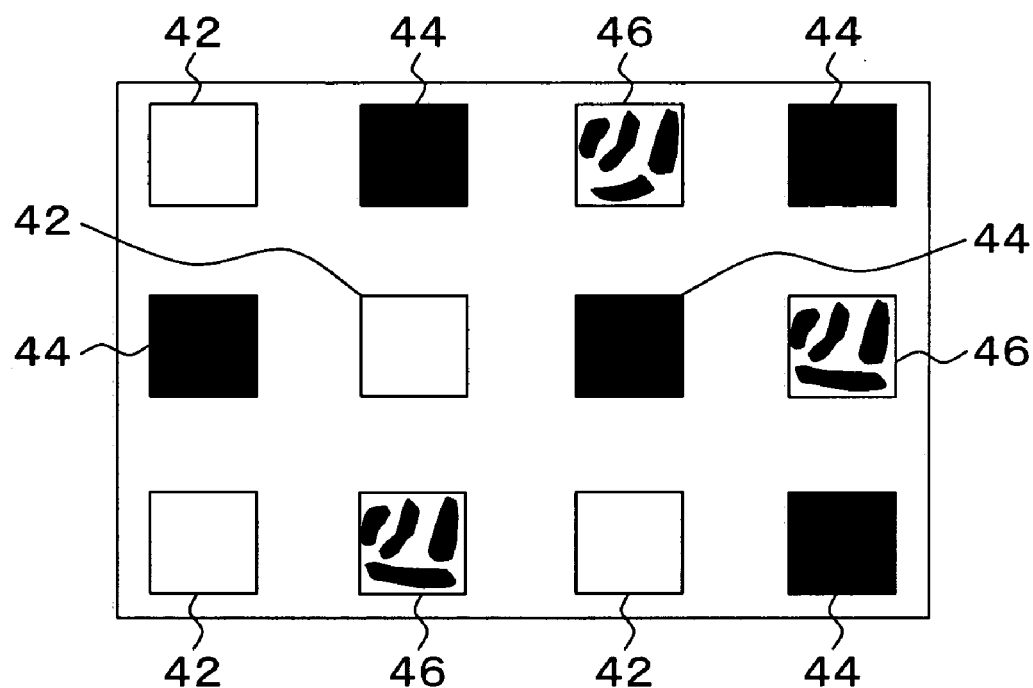
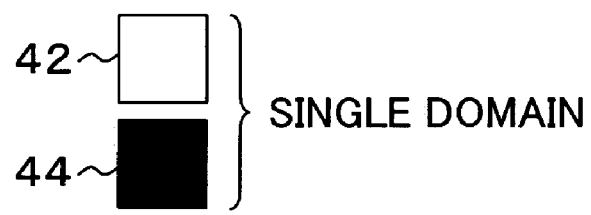 SINGLE DOMAIN
 MULTI DOMAIN

PATTERNED MEDIUM, METHOD FOR FABRICATING SAME AND METHOD FOR EVALUATING SAME

BACKGROUND OF THE INVENTION

1. Field of the Invention

The present invention relates generally to a patterned medium capable of high-density recording, a method for fabricating the same and a method for evaluating the same, and more particularly to a patterned medium for which the characteristics are optimized of magnetic metal thin film to be micro-fabricated with magnetic dots, a method for fabricating the same and a method for evaluating the same.

2. Description of the Related Art

In recent years, research and development are advanced for patterned media as the next-generation magnetic recording media replacing the thin film media. A patterned medium is a medium in which nanometer-scale micro-magnets, i.e., the so-called magnetic dots are arranged regularly in an array form on a substrate and 0 (zero)/1 (one)-digital signals for which each one (1) bit is represented by the direction of magnetization of each one magnetic dot are recorded. Since each bit is physically separated in such a patterned medium, a noise accompanied with magnetic inversion, that is a problem with a continuous film medium, is not generated and each one dot can be micronized to the limit of the thermal stability of a magnetic particle. Therefore, an ultra-high-density magnetic recording exceeding one (1) terabit/square inch can be expected. As to the structure of the magnetic recording medium using a continuous film formed by conventional sputtering etc., in order to attain high-density recording, nonmagnetic material is intentionally caused to deposit between magnetic particles, or the film property is caused to form a columnar structure (cylindrical structure) using high-gas-pressure film-forming. In these cases, portions having no magnetism, i.e., defects are produced in the magnetic film. However, those portions do not interfere with recording and reproducing because the exchange bonding force works between magnetic particles.

On the other hand, as the methods for producing a patterned medium, an approach in which a magnetic continuous film formed on a substrate is processed into a dot-array shape and an approach in which magnetic material is embedded into a substrate on which a hole array is formed are suggested. In the former production method, a fine pattern is drawn using an optical approach on a resist mask made from organic matter and applied on the magnetic film, and the magnetic film is processed into magnetic dots taking into consideration the selective ratio of the magnetic film and the photo-resist. In this case, the magnetic film is formed into the magnetic dots by forming partitions on the continuous film. However, one (1) dot is required to have a single magnetism. Therefore, the material of the magnetic metal thin film formed by sputtering as the magnetic film for patterned medium is required to have no defect. Because a patterned medium is a kind of vertical magnetic recording medium, the same material as that of vertical magnetic recording medium using a conventional continuous film is employed for it. As an evaluation index for the magnetic characteristic of recording/reproducing of patterned media, the inversion of magnetism of the dots as an aggregate has been discussed so far. However, recently, in a publication (see "Shift to Higher Resolution of Magnetic Force Microscope and Observation of Magnetic Domain of High-Density Magnetic Recording Media", Shunji Ishio, Excerpts from the 27th Academic Lecture Meeting of Japan Society of Applied Magnetic, 2003, pp. 365–366) noting the inversion of magnetism of each dot, it is reported that, from an evaluation of the structure of magnetic domains of patterned media using an MFM (Magnetic Force Microscope), it has been found that each of the dots is not independent, magnetic clusters, each including some dots1 are formed and each of the magnetic cluster as the unit has inversion of magnetism with a different coersive force. In this case, material fluctuation inherent in the continuous magnetic film before the processing has been pointed out based on the fact that the difference in coersive force between the dots could not be cancelled even when the effect of exchange interaction between adjacent dots as a result of the non-uniformity caused by the processing was excluded (see Japanese Patent Application Laid-Open Publication Nos. 2001-110050, 2003-203333 and 2000-298009).

However, as described above, in the cases of the conventional patterned media, because the same material as that of the continuous film of the vertical magnetic recording media for the magnetic metal film on which the magnetic dots are to be formed is employed, difference in magnetic inversion among individual dots becomes more remarkable as the dots become finer when local material fluctuation (fluctuation of density) is inherent in the magnetic metal film. Therefore, there is concern that actual recording/reproducing may be interfered with. In order to observe such fluctuation of material density of the dot array, there is an approach for measuring the density by optical means such as an X-ray for the continuous film in a state before processing into dots. However, the area radiated by an X-ray is in the order of several meters, therefore, only the average density within the area is measured. Therefore, even if the there is a difference of density in one (1) dot having a size in the order of several 10 nano-meters, it would be difficult to detect the difference using an X-ray.

SUMMARY OF THE INVENTION

According to the present invention there are provided a patterned medium whose fluctuation in material density is minimized of a magnetic metal film constituting magnetic dots on the patterned medium and by which a dot array optimal for recording/reproducing can be formed, as well as a method for fabricating the same and a method for evaluating the same. The present invention provides a patterned medium. The present invention is characterized by the patterned medium on which, after forming a magnetic metal thin film as a recording layer, magnetic dots arranged in an array are formed by micro-fabricating the magnetic metal thin film, wherein the patterned medium comprises the magnetic dots formed by micro-fabricating a solid state magnetic metal thin film.

The present invention provides a method for fabricating a patterned medium on which, after forming a magnetic metal thin film as a recording layer by sputtering, magnetic dots arranged in an array are formed by micro-fabricating the magnetic metal thin film. The method of the present invention comprises a dot-forming step for forming a dot array constituted by sample magnetic dots having a predetermined size larger than the magnetic dots targeting a sample medium having a magnetic metal film formed with the initial conditions; a demagnetization step for AC-demagnetizing the dot array; a ratio measurement step for measuring the ratio of single magnetic domains by observing the magnetic pattern of each of the sample dots after the AC-demagnetization; and an adjustment step for determining conditions for forming a solid state magnetic metal thin film by adjusting the film-forming conditions such that the ratio of the single magnetic domains equals to or exceeds a predetermined value. In the dot-forming step, magnetic dots having the single domain particle size determined theoretically from the magnetic metal thin film are formed as the sample magnetic dots. In the adjustment step, when the ratio of the single magnetic domains is less than a predetermined value, the film-forming conditions are adjusted by repeating the dot-forming step, the demagnetization step and the ratio measurement step such that the ratio of the single magnetic domain exceeds the predetermined value after adjusting the film-forming conditions such that the density of the magnetic metal thin film is increased. In the ratio measurement step, the ratio of single magnetic domain is measured by observing the magnetic domain pattern of each AC-demagnetized magnetic dot using a magnetic force microscope (MFM). In the adjustment step, a solid state magnetic metal thin film is formed with the film-forming conditions set such that the ratio of single magnetic domain equals to or exceeds approximately 85%. For example, the pressure of a non-volatile gas such as Ar is 5 mTorr or lower as the film-forming condition. In the adjustment step, the solid state magnetic metal thin film is preferably formed with the film-forming conditions set such that the ratio of the single magnetic domain is approximately 100%. For example, the pressure of the non-volatile gas is approximately 3 mTorr as the film-forming condition. The gas pressure of 3 mTorr corresponds to the minimum gas pressure that is dischargeable in the sputtering apparatus. In the adjustment step, power supplied during formation of a film is 30 W or higher as the film-forming condition. In the adjustment step, a distance between a substrate and a target is 20 cm or less as the film-forming condition.

The present invention provides a method for evaluating a patterned medium for evaluating the density of a magnetic metal thin film from which magnetic dots arranged in an array are formed by micro-fabrication as a recording layer of the patterned medium. The evaluation method comprises a dot forming step for forming a dot array of sample magnetic dots of a predetermined size that are larger than the magnetic dots; a demagnetization step for AC-demagnetize the dot array; a ratio measurement step for measuring the ratio of single magnetic domains by observing the magnetic domain pattern of each magnetic dot after being AC-demagnetized; and an density determination step for determining whether there is a solid state or not by comparing the measured ratio with a threshold value. In the ratio measurement step of this evaluation method, the ratio of single magnetic domain is measured by observing the magnetic domain pattern of each AC-demagnetized magnetic dot using a magnetic force microscope (MFM). In the dot forming step, magnetic dots having the single domain particle size determined theoretically from the magnetic metal thin film are formed as the sample magnetic dots. In the ratio measurement step, the ratio of single magnetic domain is measured by observing the magnetic domain pattern of each sample magnetic dot having been AC-demagnetized using a magnetic force microscope.

According to a patterned medium of the invention, a magnetic metal thin film on which magnetic dots are formed with micro-fabrication can be formed by sputtering such that the film is in the solid state. Therefore, material fluctuation, i.e., fluctuation in density inherent in the magnetic metal in a state where it is a continuous film before processing into dots can be minimized and each of the magnetic dots formed with micro-fabrication is a single magnetic domain. Therefore, there is no difference in inversion of magnetism in each dot and fabrication of patterned media having few magnetic defects is possible. Therefore, it is possible to execute securely recording/reproducing to the magnetic dots. As to the evaluation of whether a formed magnetic metal thin film is in the solid state or not, when the magnetization pattern is observed with a magnetic force microscope (MFM) for a dot array of sample magnetic dots in which the direction of magnetization has been made random by AC-demagnetization, patterns of single magnetic domains and multi-domains of the magnetic dots are observed as the result. Then, among them, the single magnetic domain is in a state where each magnetic moment as the unit is strongly bonded with other magnetic moments in a dot. Therefore, the relation is that the state of the magnetic metal thin film becomes closer to the solid state as the ratio of the single magnetic domains becomes higher. On the other hand, in the multi-domains, the relation is that the density is low (the relation in which there are many defects) compared to the solid state since the bonding among magnetic moments is weak. From these relations, an evaluation method enabling the estimation of the density of a magnetic metal thin film can be established. Therefore, the conditions for forming a solid state magnetic metal thin film can be controlled. Therefore, from the ratio of single magnetic domains in magnetic domains in dots in a dot array of the sample magnetic dots, it is possible to measure the fluctuation of the relative density. Based on the above, a solid state magnetic metal thin film can be securely formed by applying this evaluation method.

The above and other objects, features, and advantages of the present invention will become more apparent from the following detailed description with reference to the drawings.

BRIEF DESCRIPTION OF THE DRAWINGS

FIG. 5 illustrates the patterns of magnetic domains observed using an MFM in a state where the magnetic dots of the patterned medium are AC-demagnetized;

DETAILED DESCRIPTION OF THE PREFERRED EMBODIMENT

Figure 1A:
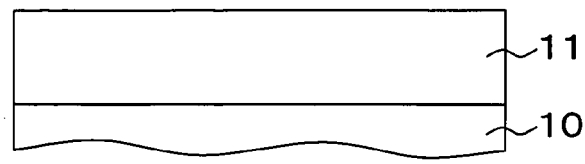
FIGS. 1A to 1F illustrate a fabricating process of a patterned medium according to the invention.
Figure 1B:
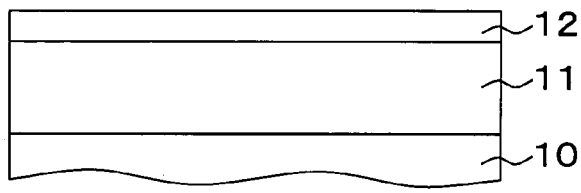

FIG. 1 illustrates the fabricating process of a patterned medium fabricated according to the invention. In order to fabricate a patterned medium according to the invention, first, as shown in FIG. 1A, a lining layer 11 is formed by sputtering in a state where a substrate 10 is set in a sputtering apparatus clarified in the following description. Next, as shown in FIG. 1B, following the lining layer 11, an intermediate layer 12 is formed by sputtering. The formation of the intermediate layer 12 is optional and there are cases where the intermediate layer 12 may not be provided. Next, as shown in FIG. 1C, a magnetic metal thin film layer 14 is formed by sputtering following the formation of the intermediate layer 12. As the magnetic metal thin film 14, for example, a CoCrPt thin film (for example, $Co_{70}(Cr_xPt_x)_{30}$) or a CoPt thin film (for example, $Co_{70}Pt_{30}$), that is known as the material of vertical magnetic recording media is used. The magnetic metal thin film layer 14 forms a recording layer constituted by a dot array by forming magnetic dots in the order of several 10 nano-meters by micro-fabrication in the following process. In the invention, for the magnetic metal thin film layer 14, the conditions for forming it in the sputtering apparatus are adjusted at the stage before the start of the fabricating process such that the layer 14 becomes solid state in forming it by sputtering. Next, as shown in FIG. 1D, a resist mask 16 is formed by applying photo-resist on the magnetic metal thin film layer 14, by exposing the photo-resist using a mask for forming a magnetic dot pattern and by applying a development process to the photo-resist. Using this resist mask 16, the magnetic dots are to be formed at portions of the magnetic metal thin film layer 14 under the photo-resist to be remained. Next, as shown in FIG. 1E, a dot array constituted by magnetic dots 18 is formed in the region of the magnetic metal thin film layer 14 by applying a dry etching process by radiating a reactive ion beam etc. In this dry etching, etching corresponding to etching the thickness of the magnetic metal thin film layer 14 shown in FIG. 1D is required. However, the resist mask 16 has been lost before the etching corresponding to etching the thickness of the magnetic metal thin film layer 14 is completed when only the resist mask 16 is formed. Therefore, in practice, a Ti layer or a Ta layer is formed on the magnetic metal thin film layer 14 and the etching conditions are adjusted such that the etching corresponding to etching the thickness of the magnetic metal thin film layer 14 is completed at the time when dry etching of the Ti layer or the Ta layer is completed. Finally, as shown in FIG. 1F, a protective layer 20 is formed at the portion on the magnetic dots 18. Here, silicon or glass is used as the material of the substrate 10, CoZrNb is used as the material or the lining layer 11 and Ti or Ru etc. is used as the material of the intermediate layer 12.

Figure 2:
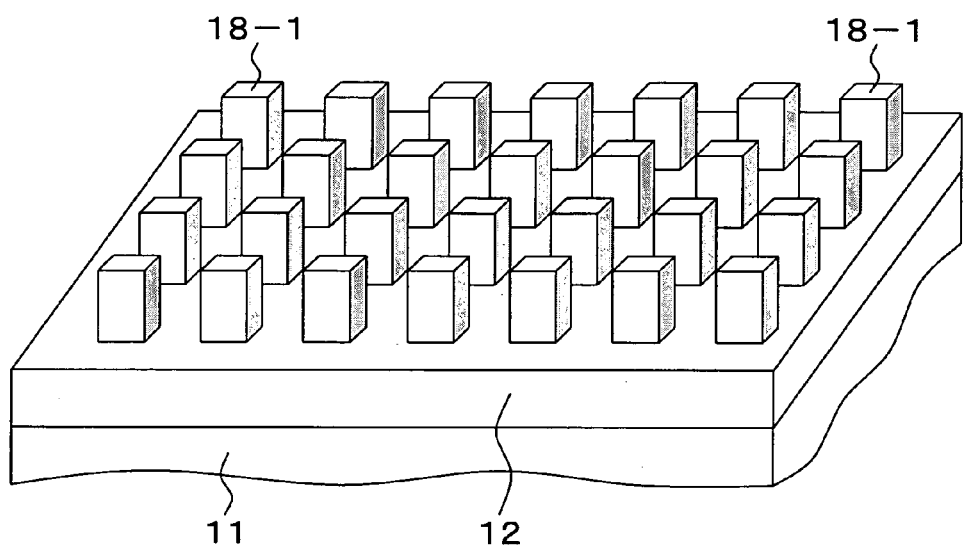
FIG. 2 illustrates the structure of a patterned media according to the invention, in which a magnetic dot array of quadrangular-prism-type magnetic dots is formed.

FIG. 2 illustrates the structure of a patterned medium according to the invention fabricated according to the fabricating process and this embodiment is characterized in that a magnetic dot array in which quadrangular-prism-type magnetic dots 18-1 as magnetic dots having a side of the size of the order of several 10 nm are arranged at a predetermined pitch is formed.

Figure 3:
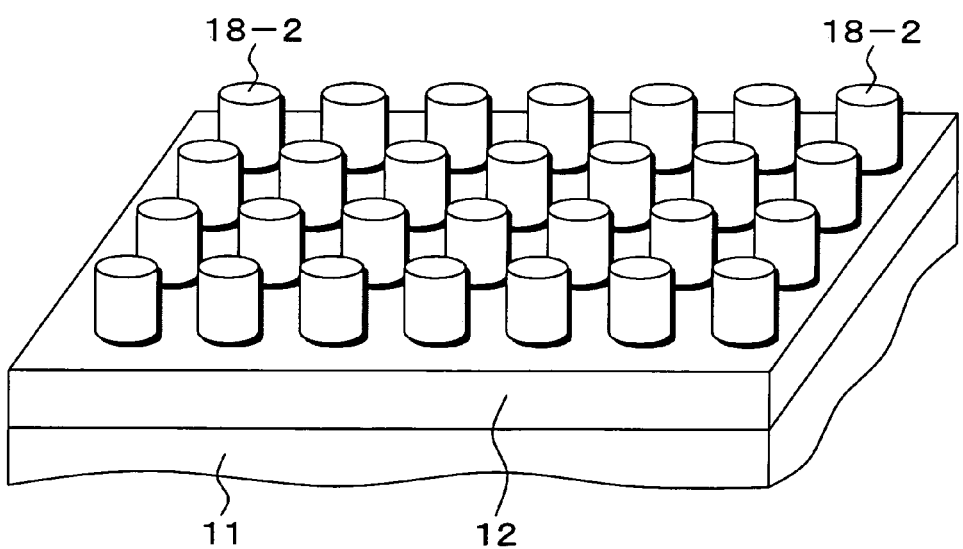
FIG. 3 illustrates the structure of a patterned media according to the invention, in which a magnetic dot array of cylindrical magnetic dots is formed.

FIG. 3 illustrates the structure of another embodiment of a patterned media according to the invention. This embodiment is characterized in that a dot array in which cylindrical magnetic dots 18-2 having a diameter having a size of the order of several 10 nm are arranged at a predetermined pitch is formed.

Figure 1C:
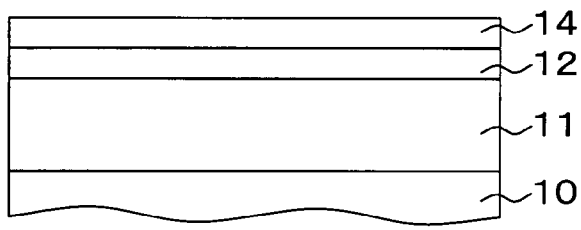
Figure 1D:
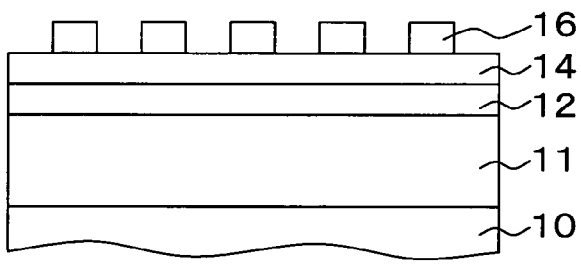
Figure 1E:
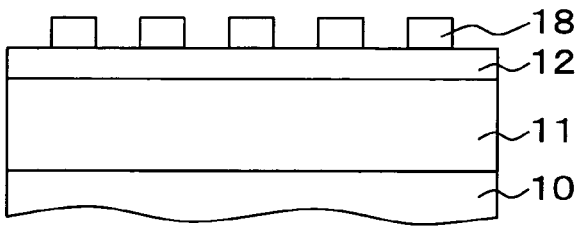
Figure 1F:
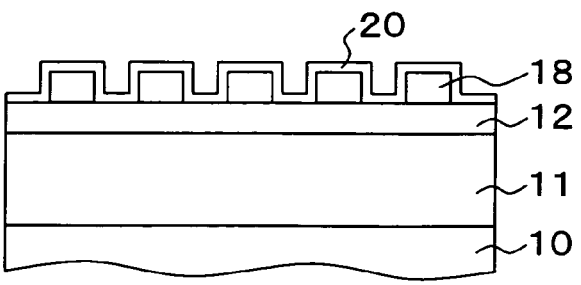
Figure 4:
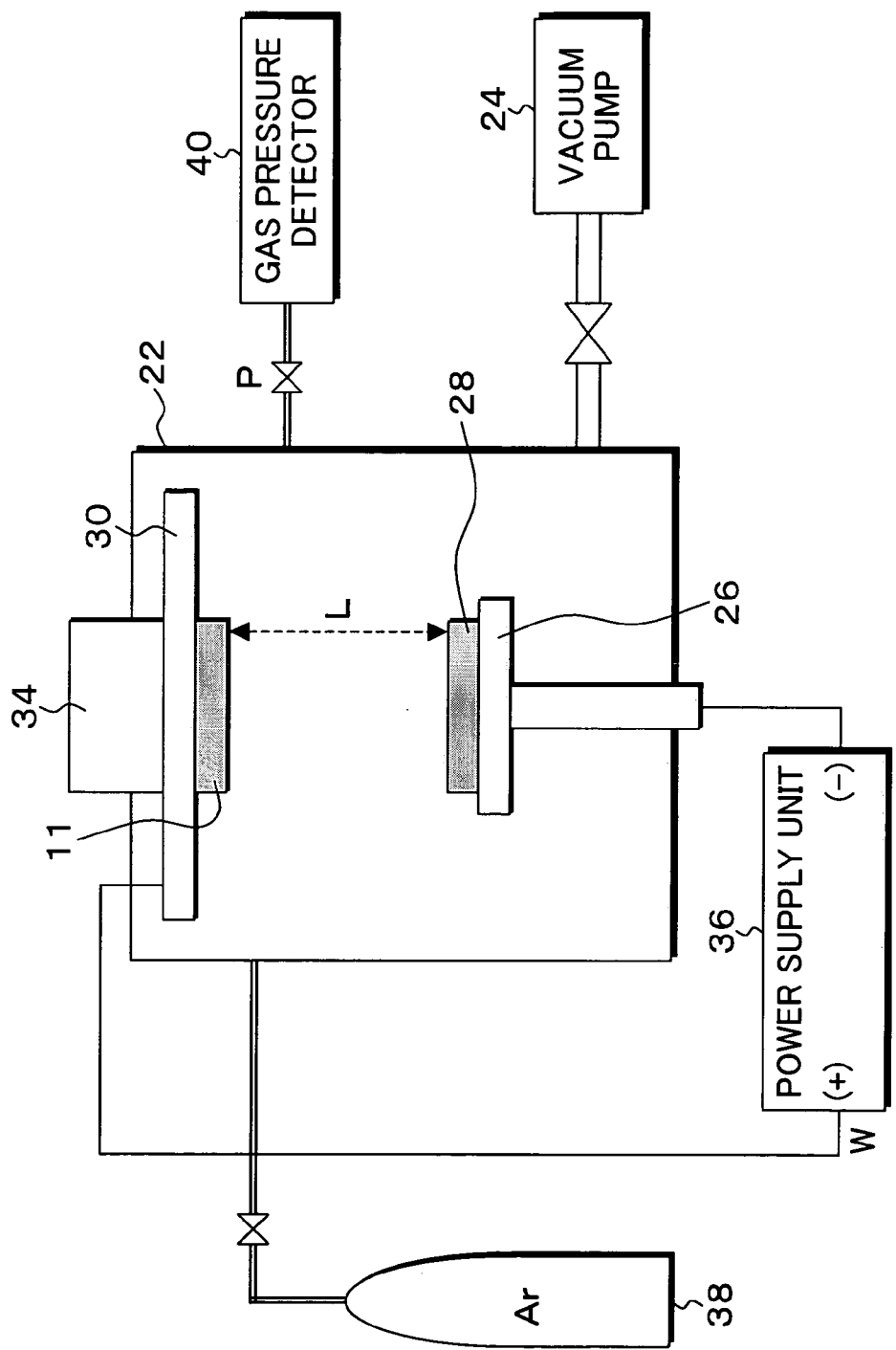
FIG. 4 illustrates the schematic structure of a sputtering apparatus used in the invention.

FIG. 4 illustrates the schematic structure of a sputtering apparatus used in the fabricating process of a patterned medium of the invention. In FIG. 4, the sputtering apparatus has a chamber 22 and the interior of the chamber 22 is maintained being evacuated by a vacuum pump 24. A target electrode 26 is provided in the chamber 22 and a target 28 is disposed on the target electrode 26. A substrate electrode 30 is disposed at a position facing the target electrode 26 through a distance L and a substrate 10 is disposed on the substrate electrode 30. The substrate electrode 30 is rotated at low velocity by a rotation drive unit 34 during sputtering. A power source unit 36 is provided for the target electrode 26 and the substrate electrode 30. The positive terminal of the power source unit 36 is connected with the substrate electrode 30 and the negative terminal of it is connected with the target electrode 26. A DC power source and a high-frequency power source are incorporated usually into the power source unit 36 and either of them can be switched and used as necessary. A non-volatile gas bottle 38 is connected with the chamber 22 and the non-volatile gas bottle 38 is filled with Ar as a non-volatile gas in this embodiment. The Ar gas is supplied into the interior of the chamber 22 and ionized by a discharge. As the non-volatile gas, there are Ne, Kr and Xe in addition to Ar. However, Ar having a high sputtering ratio for Co is desirable for sputtering in which the CoPt material of the patterned medium is the target. Furthermore, a gas pressure detector 40 for detecting the gas pressure of the Ar gas supplied from the non-volatile gas bottle 38 is provided to the chamber 22. According to the invention, when the magnetic metal thin film layer 14 is formed by sputtering as shown in FIG. 1C in such a sputtering apparatus, the gas pressure of Ar in the chamber 22 is 5 mTorr or less, the power supplied W is W=30 W or more and the distance L between the target 28 and the substrate 10 is 20 cm or less such that the density of the magnetic metal thin film layer 14 becomes that of the solid state. Such conditions for forming a film in a sputtering apparatus for obtaining the magnetic metal thin film layer 14 in the solid state are adjusted to the optimal film-forming conditions through measuring the ratio of the single magnetic domains (mono-domain) in a dot array formed using the sample magnetic dots clarified in the following description.

FIG. 5 illustrates the patterns of magnetic domains observed by a magnetic force microscope targeting a patterned medium on which sample magnetic dots similar to the quadrangular-prism-type magnetic dots shown in FIG. 2 are formed. In this observation of the magnetic pattern by a magnetic force microscope, the direction of the magnetization in the dot array is made random by applying AC-demagnetization to the magnetic dots of the patterned medium formed as a sample. Observing MFM images obtained using a magnetic force microscope for a dot array in which the directions of magnetization is made random by AC-demagnetization as above, magnetic domain patterns, for example, shown in FIG. 5 can be obtained. In FIG. 5, as the patterns of the magnetic dots, there are two (2) types of single magnetic domains 42 and 44, and a multi-domain 46. The single magnetic domain 42 and the single magnetic domain 44 are related to each other such that the directions of their magnetization are inversion of each other. The single magnetic domains 42 and 44 constitute respectively single magnetic domains while the multi-domain 46 has magnetic clusters (multi-magnetic-domain) constituted in it because there are a plurality of single magnetic domains in it. Here, there are following relations between the patterns of the magnetic domains and the density of the CoCrPt magnetic dots or CoPt magnetic dots constituting the magnetic dots.

(1) The density of the single magnetic domains 42 and 44 is almost that of the solid state because each magnetic moment as the unit is strongly bonded with other magnetic moments in each of the magnetic dots.

(2) The density of the multi-domain 46 is lower than that of the solid state because the bonding among the magnetic moments in each moment as the unit is weak in each of the magnetic dots. Therefore, it is possible to estimate the relative fluctuation of the density in the magnetic metal thin film layer 14 in FIG. 1C formed in order to form the magnetic dots from the ratio of magnetic patterns that are single magnetic domains, in magnetic dots having a specific dot size.

Figure 6:
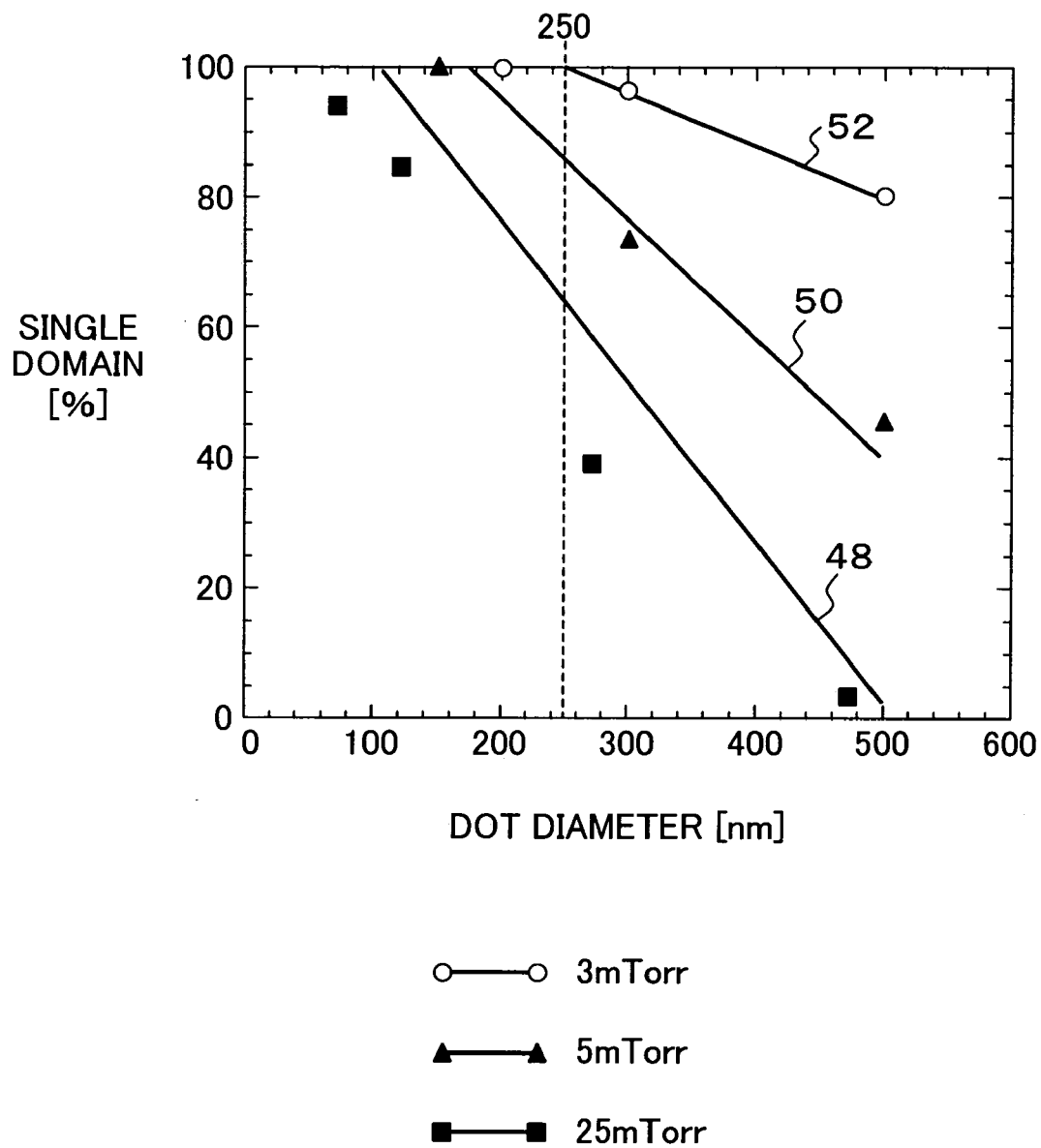
FIG. 6 is a characteristic graph showing the ratio of single domains obtained when the patterns of magnetic domains are observed after forming magnetic dot arrays having different diameters from a magnetic metal thin film formed with varied gas pressures.

FIG. 6 is a characteristics graph in which the ratio of single magnetic domains is obtained and plotted by observing magnetic domain patterns using a magnetic force microscope after a magnetic dot array constituted by magnetic dots having different diameters has been formed and AC-demagnetized on magnetic metal thin film layers formed with varied gas pressure of the Ar gas in the sputtering apparatus of FIG. 4. In FIG. 6, a characteristic line 48 represents a characteristic obtained by plotting the ratio of single magnetic domains in an MFM image observing a sample in which magnetic dot arrays each having the dot diameters of 500 nm, 300 nm, 150 nm and 100 nm are formed on a same magnetic metal thin film with a gas pressure of 25 mTorr. The number of magnetic dots contained in magnetic dot arrays having each dot diameter is approximately several hundred dots and the size of the magnetic dot array is, for example, 10 μm×10 μm for the magnetic dot diameter of 500 nm and 5 μm×5 μm for the magnetic dot diameter of 100 nm. A characteristic line 50 represents a characteristic obtained by plotting the ratio of single magnetic domains in an MFM image observing a sample having the dot diameters of 500 nm, 300 nm and 125 with a gas pressure of Ar gas of 5 mTorr. Furthermore, the characteristic line 52 represents a characteristic obtained by obtaining and plotting the ratio of single magnetic domains from an MFM image for magnetic dots having the dot diameters of 500 nm, 300 nm and 200 nm with a gas pressure of 3 mTorr. Here, a CoPt continuous film is formed by sputtering as the magnetic metal thin film layer 14 on which a magnetic dot array is to be formed. The particle size of a single magnetic domain when the ratio of Co is 80%, is calculated as approximately 250 nm using magnetization Ms and the saturated magnetic field Hk obtained from the measurement of the magnetization of the CoPt continuous film and assuming that the particle is a flattened ellipsoid.

Checking along the line indicating the dot diameter of 250 nm which coincides with the particle size of a single magnetic domain obtained theoretically from the magnetic metal thin film 14 to be this CoPt continuous film, it can be seen that the ratio of single magnetic domains is 100% on the characteristic line 52 obtained with the gas pressure of 3 mTorr. That is, setting the gas pressure of the Ar gas at 3 mTorr, a magnetic metal thin film is formed as the CoPt continuous film by sputtering and a sample magnetic dot array having the dot diameter of 250 nm that is the particle size of the single magnetic domain theoretically determined as the dot diameter for this magnetic metal thin film, is formed. Then, observing an MFM image of the sample after the sample has been AC-demagnetized in terms of the sample magnetic dot array having the dot diameter of 250 nm, it can be seen that the ratio of single magnetic domains is 100% and the theoretical value and the measured value coincide with each other. The dot diameter of magnetic dots actually formed in a patterned medium is considerably small such as 10 nm to several 10 nm compared to 250 nm that coincides with the particle size of a single magnetic domain. As a result, when a magnetic dot array is formed using a magnetic metal thin film formed by sputtering under the conditions for film-forming including the gas pressure of 3 mTorr, the ratio of single magnetic domains in an MFM image is almost completely 100% and the presence of defective magnetic dots that depends on the material fluctuation, i.e., the fluctuation of the density of the magnetic metal thin film can be excluded. In the invention, when the gas pressure P of the non-volatile gas is set as P=5 mTorr as one (1) of the film-forming conditions of the solid state magnetic metal thin film, the dot diameter for which the ratio of the single magnetic domains is 100% is obtained as approximately 180 nm from the characteristic line 50 in FIG. 6 and the dot diameter of a magnetic dot array actually formed is at largest 100 nm or less. Therefore, even with the gas pressure of 5 mTorr, it is possible that the ratio of single magnetic domains in a magnetic dot array is completely 100% when fabricated as that of a patterned medium.

Because of the above, it is desirable that the gas pressure as one (1) of the film-forming conditions for a magnetic metal thin film according to the invention is 5 mTorr. Here, it is possible to bring the density of the magnetic metal thin film to that of the solid state as the gas pressure is reduced. Referring to the characteristic shown in FIG. 6, for the case for the gas pressure of 3 mTorr, with the particle size of the single magnetic domains of 250 nm theoretically determined for the magnetic metal thin film, the measured value of the ratio of single magnetic domains is 100% as indicated by the characteristic line 52 and this gas pressure can be said to be the optimal gas pressure. When the gas pressure is lower than 3 mTorr, discharge in the chamber is impossible. Therefore, it can be said that the gas pressure of 3 mTorr is the lower limit of the gas pressure for the sputtering apparatus. On the other hand, as to the upper limit of the gas pressure for forming the magnetic metal thin film being almost solid state, the ratio of single magnetic domains for magnetic dots having the diameter of several 10 nm or less can be almost 100% even when the gas pressure exceeds 5 mTorr. However, when the gas pressure is increased, the probability that defects occur also increases. Therefore, the upper limit of the gas pressure never exceeds 10 mTorr. As to such ratios of single magnetic domains to the dot diameter through the gas pressure of the non-volatile gas as a parameter shown in FIG. 6, in the fabrication processes of a patterned medium according to the invention, a sample magnetic dot array having the dot diameter of, for example, 250 nm that is the particle size of the single magnetic domain of a CoPt magnetic metal film as a dot diameter for adjusting the film-forming conditions for producing the magnetic metal thin film in a sputtering apparatus is fabricated as a sample medium for adjustment. Then, the ratio of single magnetic domains is obtained by observing an MFM images for this sample medium and, when the obtained ratio of the single magnetic domains equals to or exceeds a threshold value, the film-forming conditions employed in the fabrication of the sample medium are determined and mass-production is started.

On the other hand, when the ratio of single magnetic domains for the sample medium is less than the threshold value, after adjusting the film-forming conditions such that the density of the magnetic metal thin film is increased, another sample medium is formed and the ratio of single magnetic domains is measured. Then, after adjusting the film-forming conditions in the sputtering apparatus for the magnetic metal thin film such that the ratio of the single magnetic domains equals to or exceeds the threshold value, mass-production of the patterned media is started. As described above, there are three (3) parameters for adjustment as follows for the film-forming conditions for the magnetic metal thin film to be obtained in the solid state including the gas pressure described above.

(1) To decrease the gas pressure of the non-volatile gas;
(2) To increase the supplied power of the sputtering apparatus; and
(3) To narrow the distance between the substrate and the target.

Figure 7:
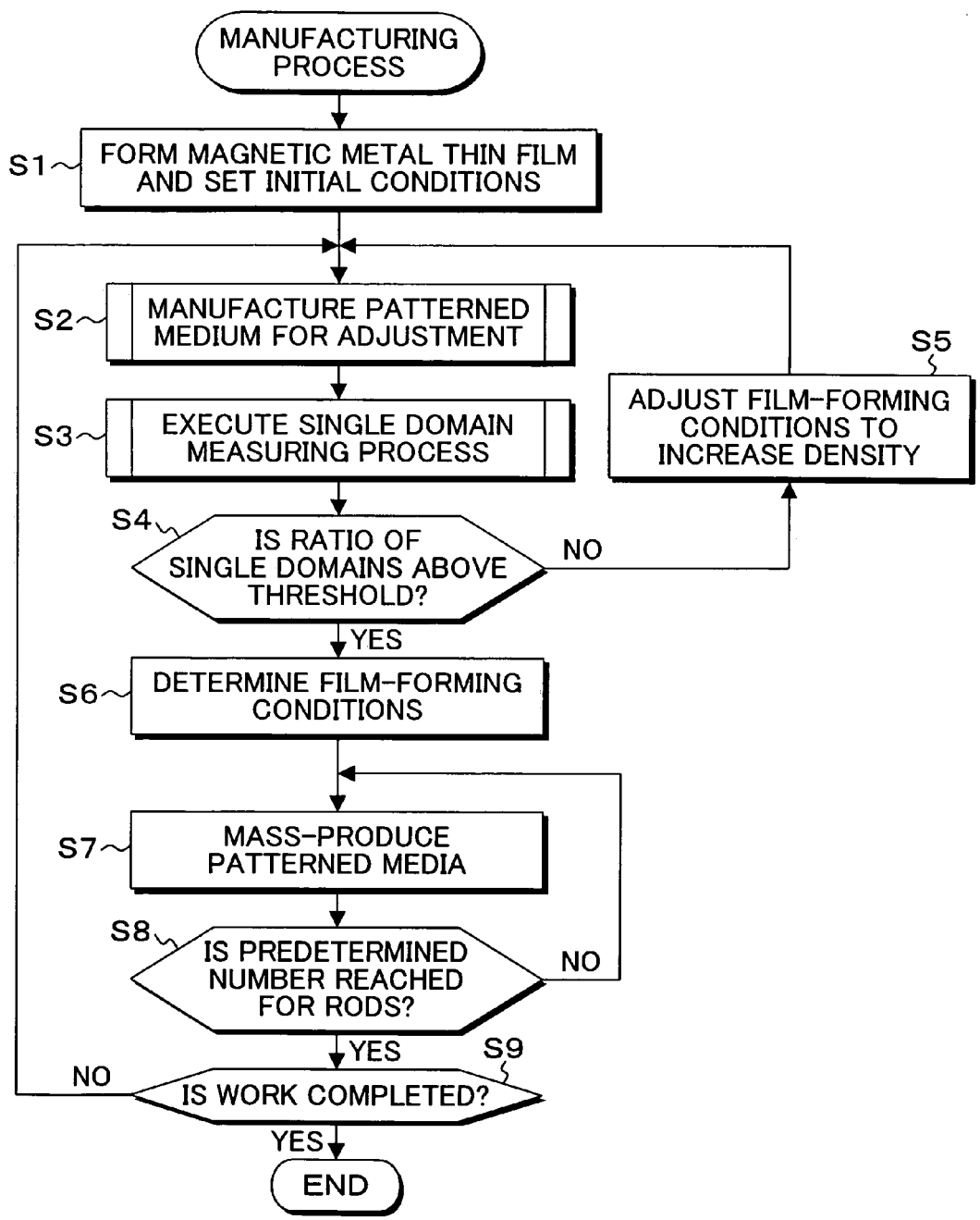
FIG. 7 is a flowchart of a fabrication process of a patterned medium according to the invention.

FIG. 7 is a flowchart of a fabrication process of a patterned medium according to the invention. In FIG. 7, first, in Step Si, the initial conditions for forming a magnetic metal thin film are set for a sputtering apparatus. Next, in Step S2, a patterned medium for adjustment, i.e., a sample medium is fabricated. Then, in Step S3, a process for measuring single magnetic domains is executed to the sample medium. When the ratio of single magnetic domains equals or exceeds a threshold value in Step S4, the initial conditions initially set in Step SI are determined as the film-forming conditions in Step S6 and mass-production of patterned media is started in Step S7. When the ratio of single magnetic domains is less than the threshold value in Step S4, the film-forming conditions are adjusted inStep S5 such that the density of the magnetic metal thin film is increased. Then, fabrication of a patterned medium for adjustment back in Step S2 and a process for measuring single magnetic domains in Step S3 are repeated and, when the ratio of single magnetic domains equals to or exceeds the threshold value in Step S4, those film-forming conditions are determined in Step S6. Then, mass-production is started in Step S7. As to the mass-production of the patterned media in Step S7, whether a predetermined number of lots is reached or not is checked in Step S8. When the predetermined number of lots is reached, the process is advanced to Step S9. When the operation is not completed, the process returns to Step S2 again and a patterned medium for adjustment is fabricated. Then, the process for measuring single magnetic domains is executed in Step S3 and whether the ratio of single magnetic domains equals to or exceeds the threshold value or not is checked. In this step, when it equals to or exceeds the threshold value, the film-forming conditions are determined to be employed and mass-production is started. On the other hand, when the ratio of single magnetic domains is less than the threshold value, after adjusting the film-forming conditions in Step S5, the film-forming conditions are adjusted in the processes of Steps S2-S4 such that the ratio of single magnetic domains equals to or exceeds the threshold value. Thereby, it is possible to guarantee the film-forming conditions of a solid state magnetic metal thin film to be appropriate against any fluctuation during the fabrication of the patterned media.

Figure 8:
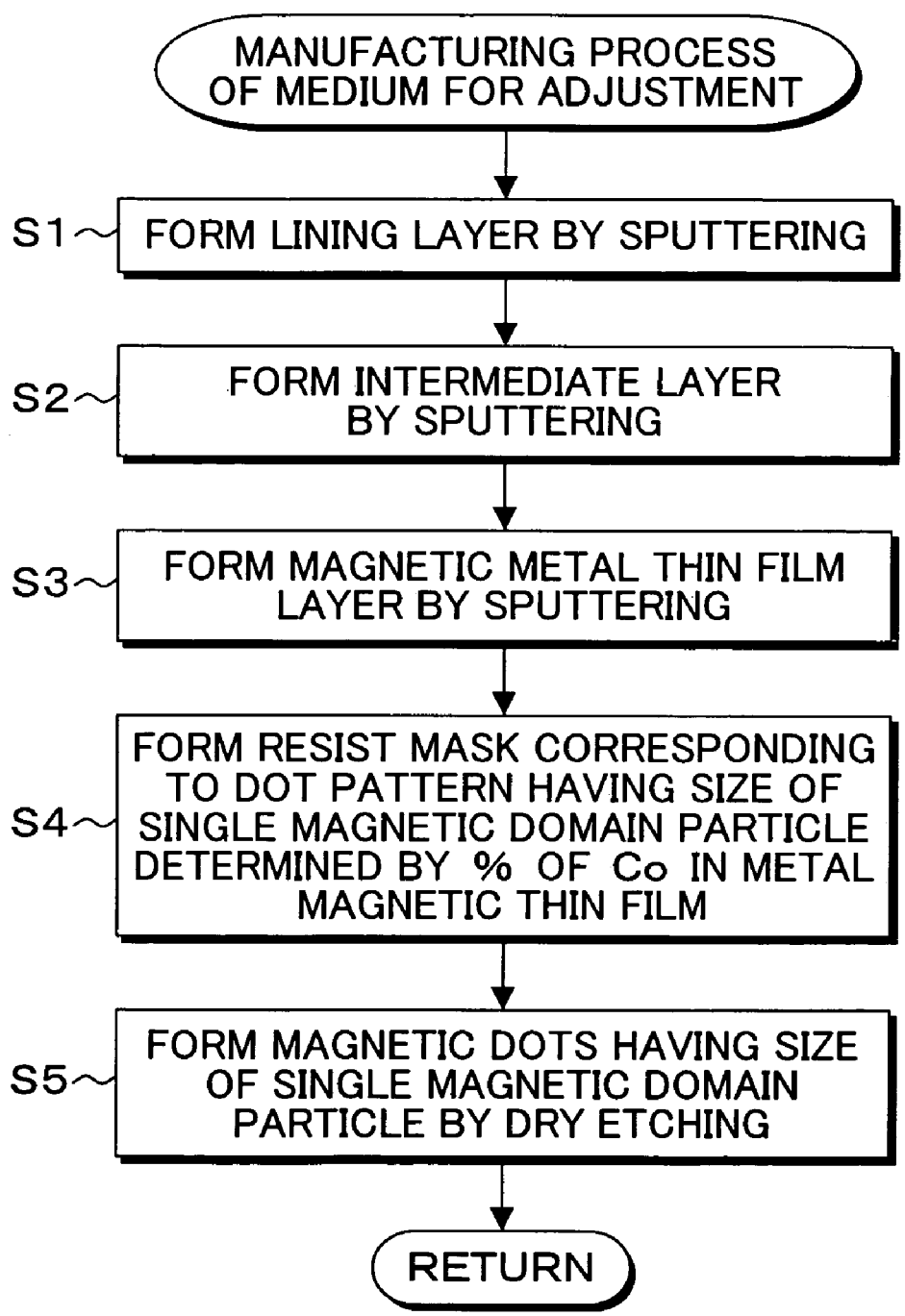
FIG. 8 is a flowchart showing the details of the fabrication process of the medium for adjustment shown in FIG. 7.

FIG. 8 is a flowchart of the fabrication process of a patterned medium for adjustment, i.e., a sample medium in Step S2 in FIG. 7. The fabrication process basically corresponds to FIGS. 1A–1E. First, in Step S1, a lining layer is formed on a substrate by sputtering. Next, in Step S2, an intermediate layer is formed by sputtering. The intermediate layer is optional and there are cases where the intermediate layer 12 may not be provided. Next, a magnetic metal thin film layer is formed by sputtering in Step S3. Then, in Step S4, a photo-resist mask corresponding to the dot pattern of the particle size of the single magnetic domains determined depending on the ratio of Co in the magnetic metal thin film is formed. For example, when the ratio of Co is 80%, a photo-resist mask of a dot pattern having a size of 250 nm corresponding to the particle size of a single magnetic domain is formed. Next, in Step S5, sample magnetic dots having a size of the particle size of a single magnetic domain are formed by dry etching. A protective layer is only for observation using an MFM and it is not necessary. The size of a sample magnetic dot is not limited to the particle size of a single magnetic domain and it may by an arbitrary size larger than the size of a magnetic dot on a pattered medium to be mass-produced.

Figure 9:
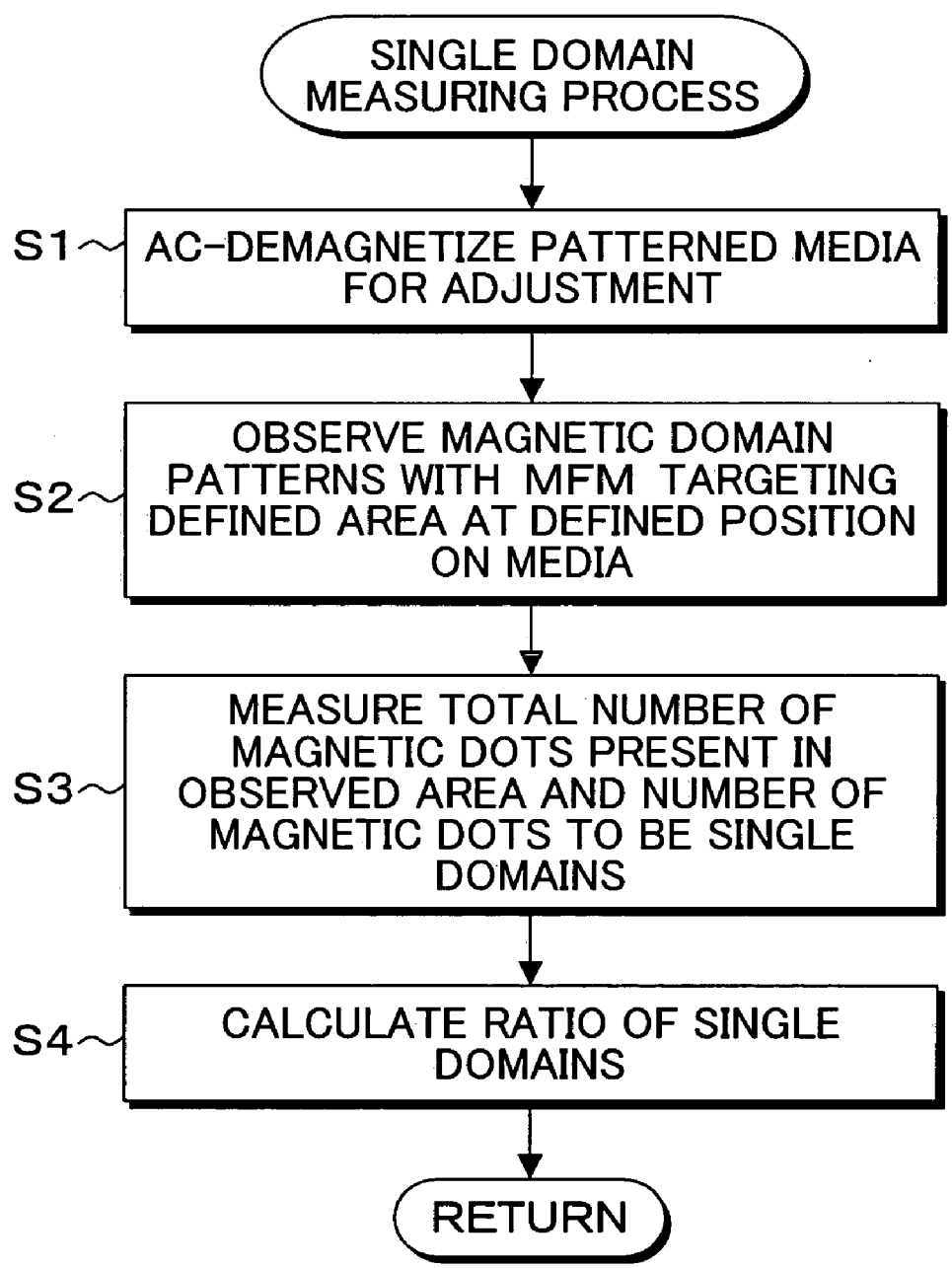
FIG. 9 is a flowchart showing the details of a measurement process of single domains shown in FIG. 7.

FIG. 9 is a flowchart showing the details of the measuring process of single magnetic domains of Step S3 in FIG. 7. In the measuring process of single magnetic domains, the direction of magnetization in the patterned medium for adjustment is made random by AC-demagnetizing the patterned medium in Step S1. Next, in Step S2, magnetic domains are observed using a magnetic force microscope (MFM) targeting a predetermined area in a predetermined position on the patterned medium. Next, in Step S3, the total number of magnetic dots and the number of magnetic dots to be single magnetic domains present in the observed area are measured. Then, in Step S4, the ratio of the dots to be single magnetic domains is calculated. Then, when the ratio of single magnetic domains equals to or exceeds, for example, 85%, it can be determined that a solid state thin film has been formed.

Figure 10:
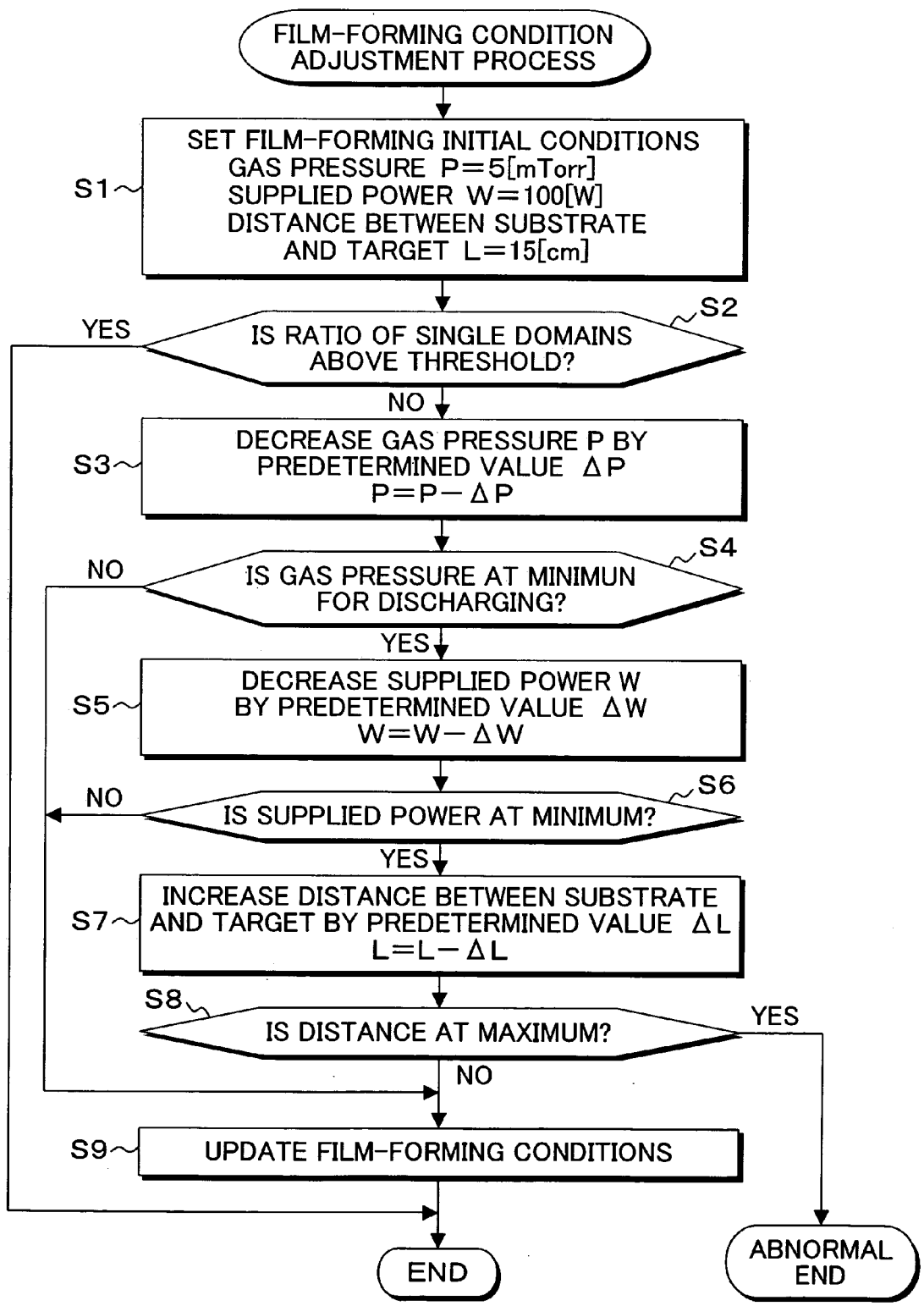
FIG. 10 is a flowchart of an adjustment process of the film-forming conditions in a sputtering apparatus.

FIG. 10 is a flowchart of setting the initial conditions in Step S1 in the production process and the process for adjusting film-forming conditions in a sputtering apparatus in FIG. 4 executed in the adjustment of the film-forming conditions in Step S5. As a sputtering apparatus in FIG. 4 used in the process for adjusting the film-forming conditions, for example, SPF-430HS from Anelva Co., Ltd. is used. This sputtering apparatus needs 0.5 kW as its maximal power to be supplied and the size of wafers that it can handle is four (4) inches in diameter. In FIG. 10, the initial conditions for forming a film are set in Step S1. In this case, the gas pressure P is set as P=5 mTorr, supplied power W is set as W=100 W and the distance between the substrate and the target L is set as L=15 cm. When the ratio of single magnetic domains measured for a sample medium on which sample magnetic dots are formed with the initial setting of such film forming conditions, equals to or exceeds the threshold value, the initial conditions of Step S1 are determined as the film-forming conditions and, therefore, the process is ended. On the other hand, when the ratio of single magnetic domains is less than the threshold value in Step S2, the process is advanced to Step S3 and the gas pressure P is reduced by a predetermined value ΔP. Then, in Step S4, whether the reduced gas pressure P is the lower limit gas pressure for discharging or not is checked. Then, when it is not or is not lower than the lower limit gas pressure for discharging, the film-forming conditions are renewed in Step S9. When the gas pressure P after the adjustment is lower than the lower limit gas pressure for discharging in Step S4, the gas pressure P is left as it is since the gas pressure can not be reduced any more. Then, the process is advanced to Step S5 and the power supplied W Ls reduced by a predetermined value ΔW. Next, in Step S6, whether the reduced power supplied W is the lower limit power supplied or not is checked. In the invention, the lower limit power supplied is 30 W. When it is not the lower limit power supplied, the film-forming conditions are renewed in Step S9. When it is lower than the lower limit power supplied in Step 6, the process is advanced to Step S7 and the distance between the substrate and the target L is widened by a predetermined value ΔL. Next, in Step S8, whether the widened distance L is the maximal distance or not is checked. In the invention, the maximal distance is 20 cm. When the widened distance is narrower than the maximal distance, the film-forming conditions are renewed in Step S9. When it equals to or exceeds the maximal distance, the process is ended since adjustment of the film-forming conditions for increasing the density is impossible any more. As the initial conditions for forming a film in the process for adjusting the conditions for forming a film in FIG. 10, for ranges of the gas pressure of 5 mTorr and higher, the power supplied of 30 W or higher and the distance between the substrate and the target of 20 cm or narrower, the conditions optimized in those ranges may be set initially when necessary. Furthermore, as to the initial conditions of Step S1, the initial values may be replaced by the film-forming conditions used in mass-production for forming films when the film-forming conditions for shifting to mass-production are determined. Furthermore, though all of the gas pressure, power supplied and the distance between the substrate and the target are combined in the embodiment in FIG. 10, any of those elements may be adjusted alone. Desirably, it is necessary to include the adjustment of the gas pressure in the film-forming conditions. The invention includes proper modifications that do not impair objectives and advantages thereof and the invention is not limited to the materials and values presented in the above embodiments.

The invention is claimed:

1. A method for fabricating a patterned medium on which, after forming a magnetic metal thin film as a recording layer by sputtering, magnetic dots arranged in an array are formed by micro-fabricating the magnetic metal thin film, the method comprising:
   a dot-forming step for forming a dot array constituted by sample magnetic dots having a predetermined size larger than the magnetic dots targeting a sample medium having a magnetic metal film formed with initial conditions;
   a demagnetization step for AC-demagnetizing the dot array;
   a ratio measurement step for measuring the ratio of single magnetic domains by observing a magnetic pattern of each of the sample dots after the AC-demagnetization; and
   an adjustment step for determining film-forming conditions for forming a solid state magnetic metal thin film by adjusting the film-forming conditions such that the ratio of the single magnetic domains equals to or exceeds a predetermined value.

2. The method for fabricating a patterned medium according to claim 1, wherein in the dot-forming step, magnetic dots having a single domain particle size determined theoretically from the magnetic metal thin film are formed as the sample magnetic dots.

3. The method for fabricating a patterned medium according to claim 1, wherein in the adjustment step, when the ratio of the single magnetic domains is less than a predetermined value, the film-forming conditions are adjusted by repeating the dot-forming step, the demagnetization step and the ratio measurement step such that the ratio of the single magnetic domain exceeds the predetermined value after adjusting the film-forming conditions such that the density of the magnetic metal thin film is increased.

4. The method for fabricating a patterned medium according to claim 1, wherein in the ratio measurement step, the ratio of single magnetic domain is measured by observing a magnetic domain pattern of each AC-demagnetized magnetic dot using a magnetic force microscope.

5. The method for fabricating a patterned medium according to claim 1, wherein in the adjustment step, a solid state magnetic metal thin film is formed with the film-forming conditions set such that the ratio of single magnetic domain equals to or exceeds approximately 85%.

6. The method for fabricating a patterned medium according to claim 5, wherein A pressure of a non-volatile gas is 5 mTorr or lower as one of the film-forming condition.

7. The method for fabricating a patterned medium according to claim 6, wherein in the adjustment step, power supplied during formation of the solid state magnetic metal thin film is 30 W or higher as one of the film-forming conditions.

8. The method for fabricating a patterned medium according to claim 6, wherein in the adjustment step, a distance between a substrate and a target is 20 cm or less as one of the film-forming conditions.

9. The method for fabricating a patterned medium according to claim 1, wherein in the adjustment step, the solid state magnetic metal thin film is formed with the film-forming conditions set such that the ratio of the single magnetic domain is approximately 100%.

10. The method for fabricating a patterned medium according to claim 9, wherein in the adjustment step, a pressure of a non-volatile gas is approximately 3 mTorr as one of the film-forming conditions.

11. The method for fabricating a patterned medium according to claim 10, wherein in the adjustment step, power supplied during formation of the solid state magnetic metal thin film is 30 W or higher as one of the film-forming conditions.

12. The method for fabricating a patterned medium according to claim 10, wherein in the adjustment step, a distance between a substrate and a target is 20 cm or less as one of the film-forming conditions.

* * * * *